United States Patent [19]
Kerper

[11] Patent Number: 5,227,924
[45] Date of Patent: Jul. 13, 1993

[54] HORIZONTALLY ADJUSTABLE REARVIEW MIRROR

[75] Inventor: Richard W. Kerper, Beverly Hills, Mich.

[73] Assignee: Delbar Products, Inc., Perkasie, Pa.

[21] Appl. No.: 956,301

[22] Filed: Oct. 5, 1992

[51] Int. Cl.$^5$ .............................................. G02B 7/18
[52] U.S. Cl. ..................................... 359/875; 359/872; 359/881; 248/479
[58] Field of Search ............... 359/841, 844, 871, 872, 359/875, 881, 882; 248/479, 480, 481, 482

[56] References Cited

U.S. PATENT DOCUMENTS

| | | | |
|---|---|---|---|
| 2,705,122 | 3/1955 | Whitehead | 248/480 |
| 3,778,015 | 12/1973 | Holzman | 248/475.1 |
| 4,165,156 | 8/1979 | O'Connell | 359/841 |
| 4,443,057 | 4/1984 | Bauer et al. | 359/606 |
| 4,448,777 | 12/1984 | Bauer et al. | 359/606 |
| 5,096,283 | 3/1992 | Croteau | 359/872 |

*Primary Examiner*—Bruce Y. Arnold
*Assistant Examiner*—J. P. Ryan
*Attorney, Agent, or Firm*—Reising, Ethington, Barnard, Perry & Milton

[57] ABSTRACT

The invention relates to an outside rear viewing mirror of the type wherein a mirror head assembly is supported upon and rotated relative to the support arm to permit normal adjustment of the rear viewing field of vision and further which includes a mechanism for adjusting the lateral or axial position of the mirror head assembly along the support arm when the mirror head assembly is rotated to a forward facing, non-viewing position relative to the support arm.

10 Claims, 4 Drawing Sheets

HORIZONTALLY ADJUSTABLE REARVIEW MIRROR

TECHNICAL FIELD

The present invention relates to a horizontally adjustable rearview mirror adapted to be mounted on the outside of a vehicle. More particularly, such mirror is particularly advantageous for use with utility vehicles such as trucks, vans or other vehicles where a load is being towed or trailed behind the vehicle so as to require the mirror head to be moved laterally outwardly to permit better viewing around the rearward load.

In making any rearward viewing outside mirror adjustable, it is necessary to create a structure which reduces the likelihood of vibration of the mirror head and which vibration can result in blurred images when looking rearwardly through the mirror. Accordingly, it is the purpose of the subject invention to provide an outwardly adjustable mirror assembly wherein the mechanism for permitting horizontal adjustment also provides a firm connection between the mirror head and the mirror head supporting arm which is, in turn, mounted to the exterior surface of the vehicle.

It is a more specific object of the present invention to provide a mirror head including an interiorly mounted clamping device which coacts with a cam and bushing device mounted on the mirror head support arm such that when the mirror is in its normal rearward viewing position, the mirror head is tiltably or rotatably supported upon its support arm for normal rear viewing adjustment but which head cannot be adjusted horizontally or moved parallel to the axis of its support arm. On the other hand, when it is desired to move the mirror head horizontally, inboard or outboard, relative to its support arm and the vehicle, then, by rotating the mirror head toward a forwardly facing position, the mirror head clamping device coacts with the support arm mounted cam device to loosen the clamping mechanism to permit the appropriate inboard or outboard movement. When the mirror is in its properly adjusted inboard or outboard position, the mirror head is once again rotated about its support arm to its normal rearward facing position in which the clamping device once more reengages in such a way as to prevent any further inboard or outboard adjustment of the mirror head.

PRIOR ART

The closest prior art of which the inventor is aware are U.S. Pat. Nos. 3,778,015 Holtzman and 4,165,156 O'Connell. The Holtzman patent shows an outside mounted mirror which includes a support arm pivotally mounted to the side wall of the vehicle with an adjustable mirror head mounted on the support arm. Thus, by rotating the support arm about its pivot points through an arcuate path, the mirror head would be moved inboard or outboard relative to the side wall of the vehicle and thereafter the mirror head adjusted for proper rear viewing. Holtzman does not provide for any relative horizontal or lateral movement between the mirror head and its support arm. O'Connell likewise, provides a support arm pivotally supported to the vehicle side wall primarily for the purpose of folding the support arm against the vehicle side wall to prevent damage to the mirror assembly. However, in order to provide relative inboard and outboard movement of the mirror head relative to the vehicle, O'Connell utilizes an intermediate support arm pivotally connected at the outer end of the support arm and also pivotally connected to the mirror head. As best seen in FIG. 3 of the O'Connell patent, by rotating the intermediate mirror head support arm, the mirror head can be moved horizontally relative to the vehicle side wall. By mounting his mirror head in cantilever fashion through the outer end of an intermediate and extra support arm, O'Connell creates a mirror head mounting assembly much more likely to vibrate and blur rearward vision than is the case with the subject invention.

SUMMARY OF THE INVENTION

The invention relates to an outside rearview mirror of the type including a mirror head assembly adapted to be adjustably mounted on a laterally extending support arm which is itself pivotally mounted upon and projects laterally from the side panel of a vehicle. The mirror head assembly is supported upon the arm and is rotatably adjustable relative thereto to vary the normal rear viewing field vision and includes a mechanism for adjusting the lateral distance of the mirror head assembly from the pivotally mounted end of the support arm. More specifically, the support arm includes a laterally extending shaft having a longitudinal axis upon which the mirror head assembly is mounted. The mirror head assembly comprises a hollow housing within which the adjusting mechanism is mounted and further includes bearing elements for supporting the mirror head for coaxial rotation about the shaft. The mirror head assembly also includes a clamping device for restraining the mirror housing against longitudinal movement relative to the shaft while still permitting the mirror head to be rotatably adjusted relative to the shaft. Lastly, the mirror head assembly includes a cam member adapted to coact with the clamping device when the mirror head assembly is rotated to a forward-facing non-viewing position to allow longitudinal or axial adjustment of the mirror head assembly along the shaft.

DESCRIPTION OF THE PREFERRED EMBODIMENT

Figure 1:
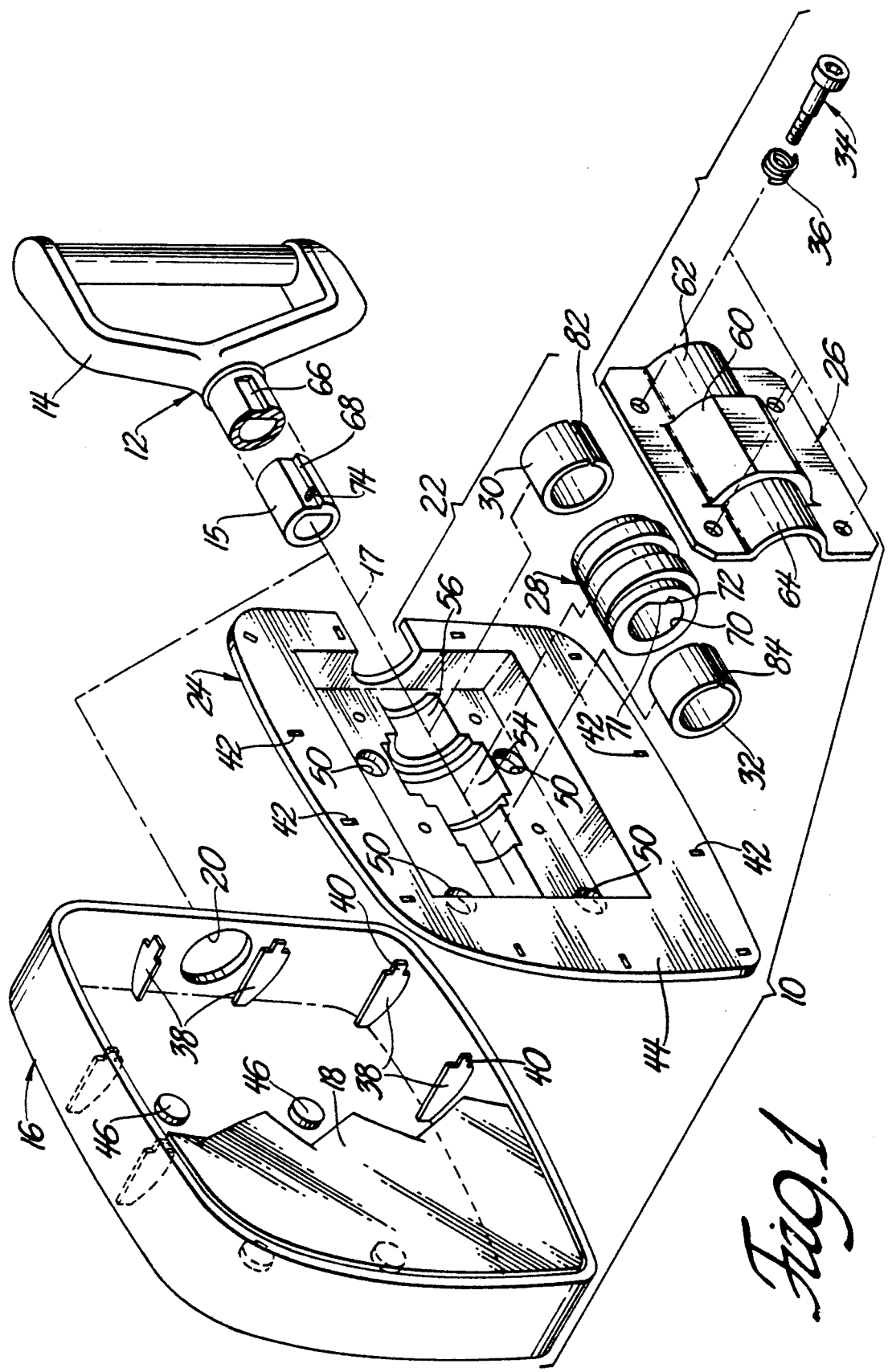
FIG. 1 is a an exploded view of the mirror head, support arm, cam/bushing assembly and the mirror head clamping device.

As best seen in FIG. 1, a mirror head assembly is indicated generally at 10 and is adapted to be adjustably mounted on a support arm indicated generally at 12. Support arm 12 includes an inner end 14 adapted to be swingably mounted to a vehicle side wall through a suitable supporting bracket not shown. Thus, the support arm is adapted to swing in an arc to adjust the horizontal field of vision and for folding the arm and mirror head against the vehicle side wall to avoid damage to the mirror head assembly under certain conditions. The support arm includes a cylindrical shaft portion 15 having a longitudinal axis 17.

Mirror head assembly lo includes an outer casing 16 having a rearwardly facing opening into which a mirror 18 is suitably mounted. Casing 16 includes a side wall opening 20 adapted to receive support arm shaft 15. A mirror mounting subassembly is indicated generally at 22 and includes a backing member 24 and a clamp member 26, a cam element is indicated generally at 28 which along with bushings 30 and 32 are adapted to be mounted on support arm shaft 15 after the latter is inserted within the mirror head. The cam and bushings are clamped between plates 24 and 26 which are retained together through suitable screw elements 34 and intermediate springs 36.

While housing 16 and plates 24 and 26 may be formed of any suitable material, it is preferred to form these members out of a suitable plastic material such as Noryl a product of General Electric Corporation.

Figure 2:
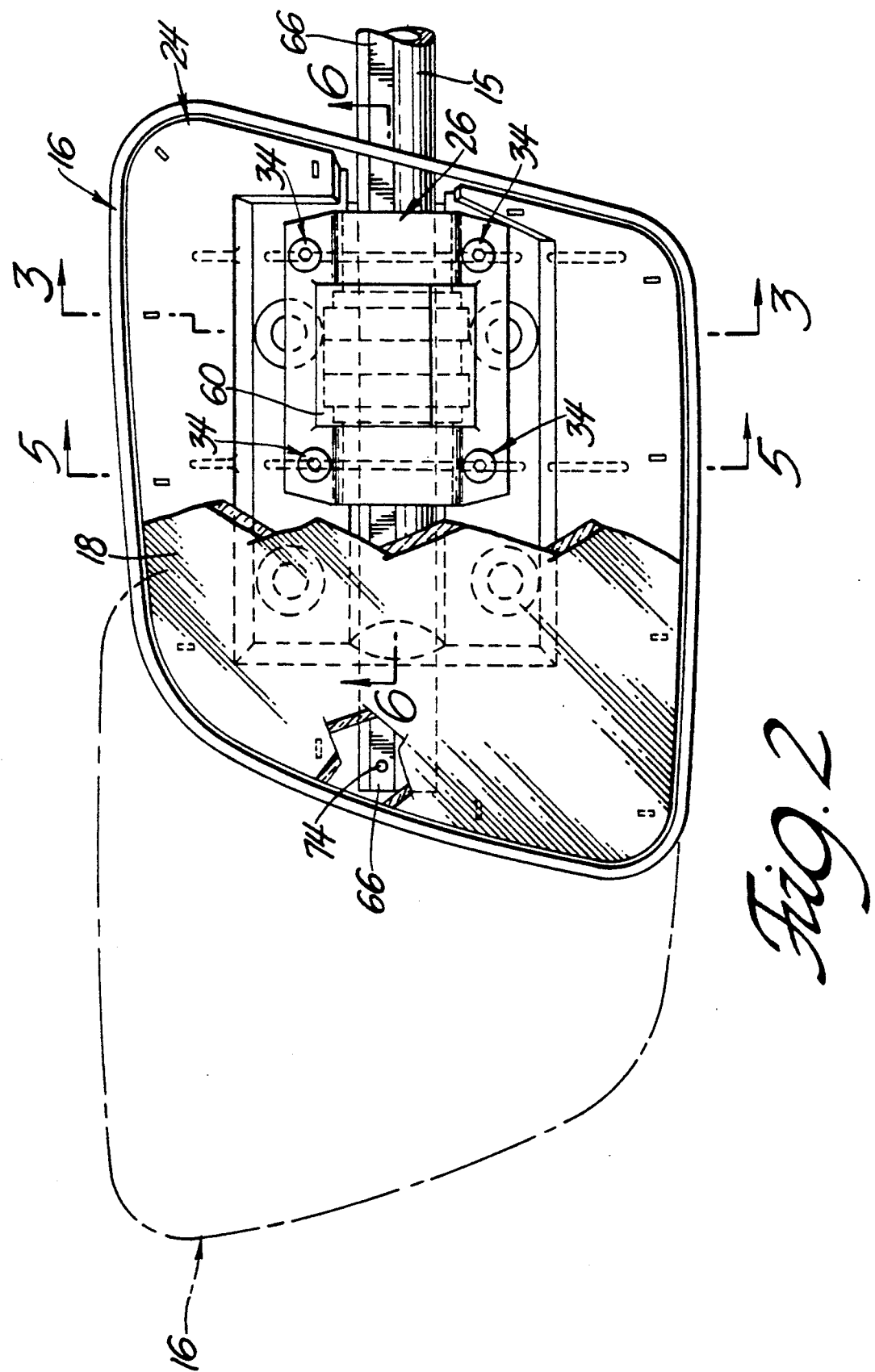
FIG. 2 is a partially broken away elevational view through the mirror head showing the mirror head mounted upon its support arm and also showing in phantom the mirror head horizontally moved to a more outward position relative to the support arm and rotated to a forwardly facing clamp releasing position.
Figure 3:
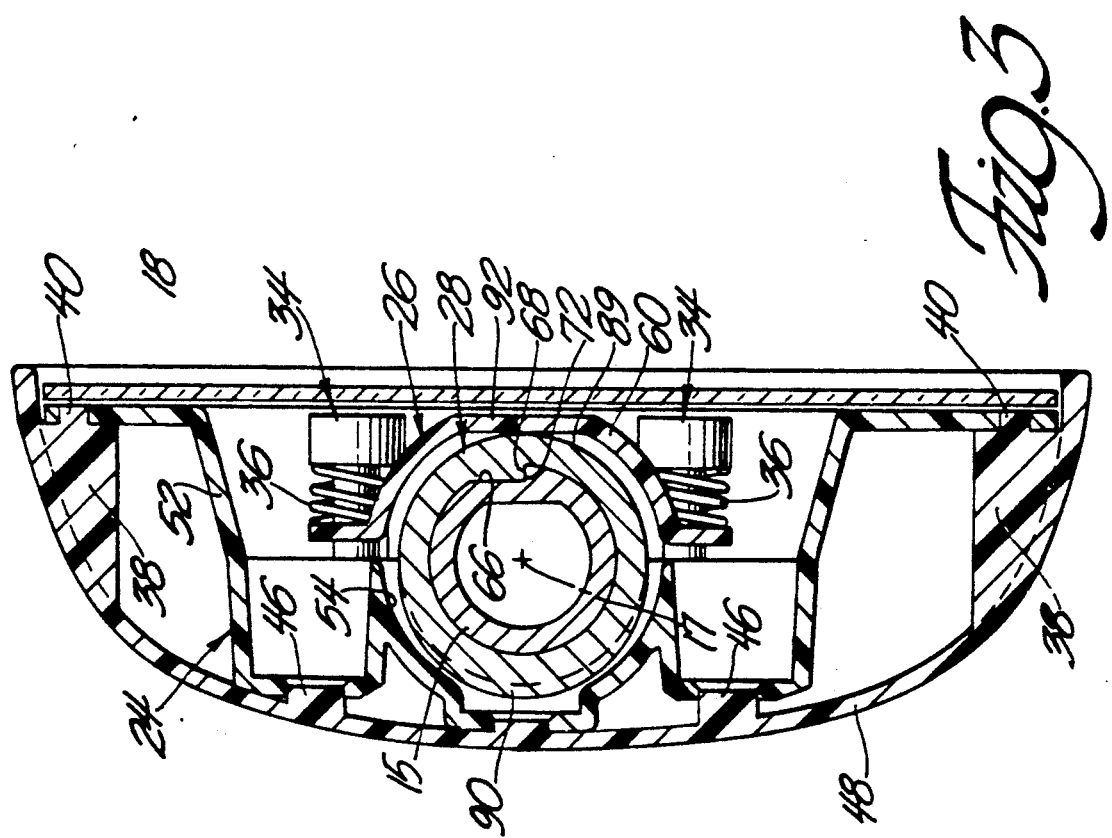
FIG. 3 is a cross-sectional view along line 3—3 of FIG. 2.

Referring particularly to FIGS. 2 and 3, it will be noted that housing 16 includes a plurality of integrally molded stops 38 including rearwardly extending projections 40 adapted to extend through corresponding slots 42 formed in flange 44 of plate 24. Another set of projections 46 are molded in the inner surface of housing wall 48 and project through corresponding openings 50 in a rearwardly projecting portion 52 of plate 24. Rearwardly projecting portion 52 of plate 24 includes a first semicircular cylindrical portion 54 adapted to receive cam element 28. Plate 52 also includes a pair of semicircular, cylindrical portions 56 and 58 respectively disposed adjacent the center cylindrical portion 54 and adapted to receive bushings 30 and 32.

Clamping plate 26 includes a cylindrical recess 60 corresponding to recess 54 in plate 24 as well as adjacent recesses 62 and 64 corresponding to recesses 56 and 58 in plate 24 and are adapted respectively to receive cam element 28 and bushing elements 30 and 32.

Referring to mirror head supporting shaft 15, particularly as seen in FIG. 1, the outer surface of the shaft includes a planar recessed surface 68 which extends substantially throughout the longitudinal length of the outer surface of the shaft. The planar surface 66 defines a ledge 68. Cam element 28 includes a cylindrical inner surface 70 corresponding generally in diametral size to that of support arm shaft 15 and is likewise formed with a planar surface 71 which defines a ledge 72 adapted to coact with ledge 68 of shaft 15.

Figure 4:
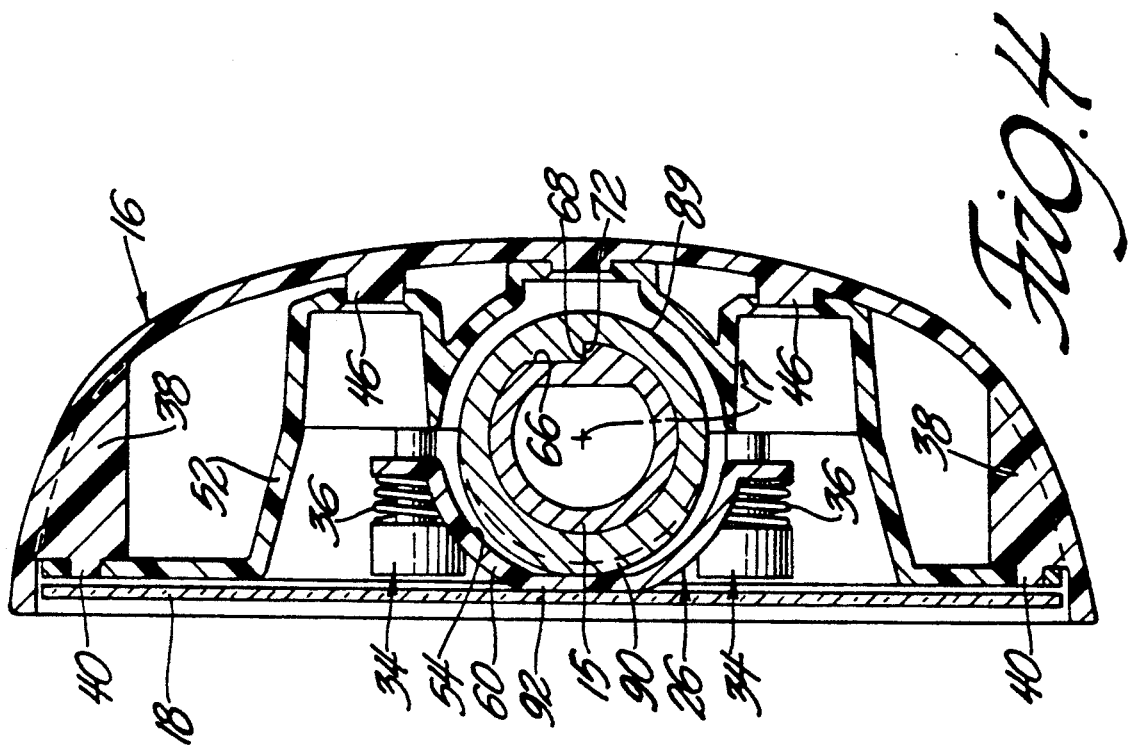
FIG. 4 is a view similar to that of FIG. 3 but with the mirror head rotated 180 degrees to a forwardly facing position in which the mirror head is horizontally adjustable.

The manner in which the various parts are assembled and their function will now be described in detail. In assembling the parts, the last part to be added to the assembly is the mirror 18, thus, the assembly to be described takes place prior to the mounting of the mirror to housing 16. The first step in the assembly is to mount backing plate 24 in the mirror head casing 16 such that the housing projections 40 and 46 project through the corresponding openings or slots 42 and 50 in the backing plate. Once so assembled, the parts are held together either by being press fitted, fused or cemented. Next, a mirror head retaining pin 74 is removed from support shaft 15 and the shaft inserted through the opening 20 of the mirror head housing 16 and opening 76 in backing plate 24. Before the shaft 15 is fully inserted within the housing, cam element 28 and bushings 30 and 32 are loosely seated within the cylindrical recesses in portion 52 of backing plate 24. As the insertion of shaft 15 continues, it extends through the hollow bushings 30 and 32 and intermediate cam element 28. The cam element and shaft 15 are aligned such that the planar surface 66 and ledge 68 nest together with inner cam surface 71 and ledge 72, particularly as seen in FIGS. 3 and 4. During the insertion, shaft 15 extends through bushings 30 and 32 slightly expanding gaps 31 and 33 to provide frictional and circumferential engagement between the shaft and bushings. Once shaft 15 is fully inserted within the mirror head, retaining pin 74 is once again inserted within the shaft as seen in FIG. 2, and thereby preventing the mirror head from sliding off the support arm shaft 15.

Figure 5:
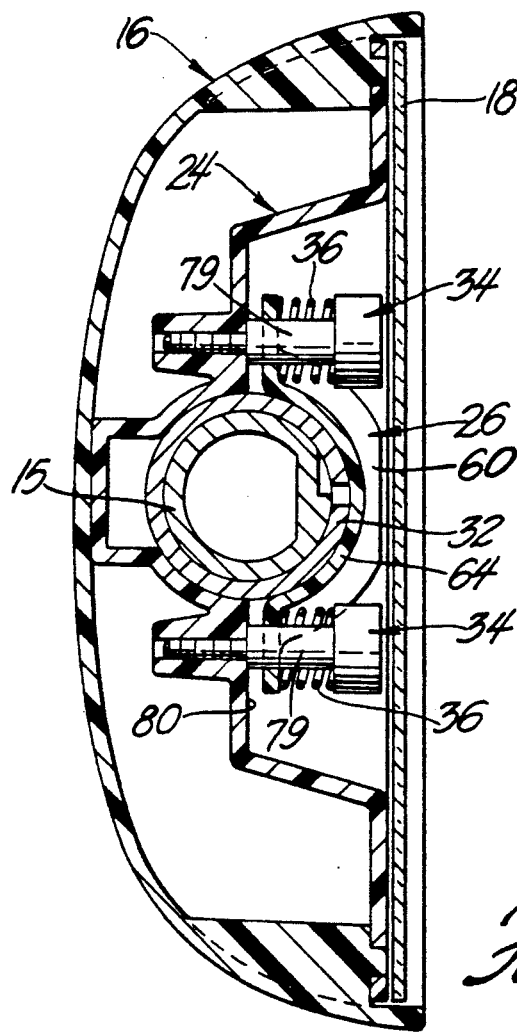
FIG. 5 is a side elevational view along line 5—5 of FIG. 2.
Figure 6:
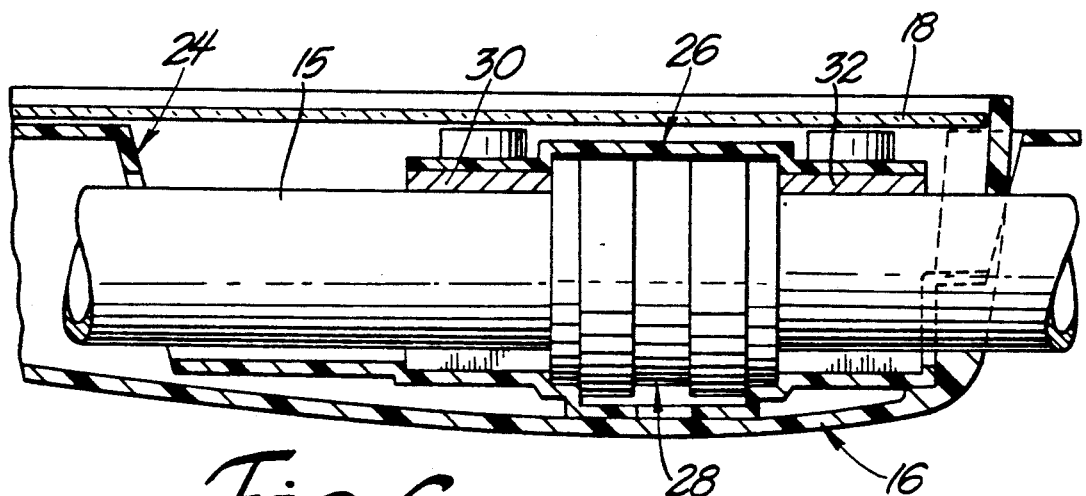
FIG. 6 is a partially sectioned plan view showing the relationship between the clamping and cam/bushing devices.

The next step in the assembly is to mount clamp plate 26 to the backing plate through screws 34 and intermediate spring 36. As best seen in FIG. 5, clamp plate portions 62 and 64 are resiliently biased by spring 36 against the bushing elements 30 and 32 and thereby frictionally retaining the mirror head in a predetermined, tilted or angular position on shaft 15. As best seen in FIG. 5, the unthreaded portions 79 of screws 34 include shoulders adapted to abut against the corresponding face 80 of rear plate section 52. Thus, the screws are threaded into plate 24 until the screw shoulders abut against plate surface 80 which compresses the springs 36 and thereby applying a predetermined clamping pressure to clamping plate 26 and against bushings 30 and 32.

The final assembly step is to mount the mirror 18 to the housing 16.

Other important structural details of the various elements will now be described before describing how the device functions. First, it is to be noted that bushings 30 and 32 are respectively slotted as indicated at 82 and 84. The purpose of the slots is to be sure that the bushings circumferentially engage with shaft 15 and do not become ovalized under the loads imposed thereon by springs 36. In this way the mirror head tilting forces are smooth or constant during the normal rearview tilting motion of the head.

Next, it is to be noted that the respective planar surface 66 and ledge 68 of shaft 15 and the corresponding planar surface 71 and ledge 72 of cam element 28 coact to retain the cam element 28 in a non-rotating relationship to the shaft 15. As best seen in FIGS. 3 and 4, it will be noted that cam element 28 includes longitudinally spaced eccentric portions or surfaces 90 which progressively thicken or increase radially beginning approximately over the 180 degrees of the outer cam element surface opposite the planar surface 66 of shaft 15 or ledges 68 and 72. For convenience, this progressively deepening or thickening portion of the cam element can be referred to as being on the backside of the cam element or that portion disposed within the cylindrical portion 54 of backplate 24 when the mirror head is in its normal rearward viewing position as shown in FIG. 3. Thus the cam element 28 has a first or front-facing outer surface 89 concentric with shaft 15 and a second or rear-facing, outer surface 90 eccentric with the shaft with each of said surface extending approximately 180 degrees.

In the normal rear viewing position of the mirror head 16 as seen in FIG. 3, the outer surfaces of 89 and 90 of the cam element are not engaged with either the backplate 24 or the coverplate 26. In this position, the mirror head clamping action is upon the bushings 30 and 32 leaving the cam element unengaged. Thus, normal rear viewing tilting or rotating action of the mirror head will be frictionally resisted by the resilient engagement of clamp late portions 62 and 64 against bushings 30 and 32.

Importantly, the longitudinal spacing of bushings 30 and 32 on either side of cam element 28 provides excellent stability of the mirror assembly 10 on support shaft 15 thus reducing the likelihood of mirror head vibration. The means for releasing the clamping action to permit relative longitudinal movement of the mirror head assembly 10 along the support arm shaft 15 will now be described.

To release the clamping action and as best seen in FIG. 4, the mirror head assembly 10 is rotated to its forward facing or non-viewing position. In so rotating, a flat portion 92 of clamping plate portion 54 progressively engages radially increasing portions or lands 90 of cam element 28 compressing springs 36 and moving clamping plate 26 away from the housing plate 24. As the clamping plate so moves, portions 62 and 64 lift off of bushings 30 and 32 relieving the frictional pressure of the bushings against shaft 15 sufficiently to allow the mirror head assembly 10 to be moved longitudinally along the shaft, inwardly or outwardly to the desired lateral spacing from the vehicle body.

The rapidity with which clamping plate 26 moves away from housing plate 24 is determined by the cam slope or the rate at which the cam radius of lands 90 increase. By disposing the cam eccentricity over the rear 180 degrees of the outer cam element surface, the unclamping action is the same whichever direction the mirror is rotated about the shaft axis.

Other modifications of the invention may be made within the intended scope of the invention as set forth in the hereinafter appended claims.

What is claimed is:

1. An outside rear viewing vehicle mirror of the type including a mirror head assembly (10); a support arm (12) adapted to be pivotally mounted on and project laterally from a side panel of the vehicle; said mirror assembly being supported upon said arm and adjustable relative thereto to vary the rear viewing field of vision and a mechanism (22) for adjusting the lateral distance of the mirror head assembly from the pivotally mounted end of the support arm, the improvement comprising:

said support arm having a laterally extending shaft (15) with a longitudinal axis (17); said mirror head assembly having a mirror housing (16); said adjusting mechanism (22) being mounted within said housing and including bearing means (30, 32) for supporting the mirror head housing (16) for coaxial rotation about said shaft, clamping means (24, 26) for restraining the mirror housing against longitudinal movement relative to said shaft, and a cam member (28) adapted to coact with the clamping means to reduce the latter's clamping action to allow longitudinal adjustment of the mirror head assembly along said shaft.

2. An outside rear viewing vehicle mirror as set forth in claim 1 wherein said bearing means includes a pair of cylindrical bushing elements (30, 32) coaxially supported upon and frictionally engaging the shaft (15), the cam element (28) coaxially mounted upon said shaft and disposed longitudinally intermediate the bushing elements.

3. An outside rear viewing vehicle mirror as set forth in claim 2 wherein the bushing elements (30, 32) include slots (82, 84) providing circumferential gaps whereby the frictional engagement of the bushing elements may be varied by the clamping means.

4. An outside rear viewing vehicle as set forth in claim 2 wherein the cam element (28) and the shaft (15) include coacting surfaces (71, 72, 66, 68) which prevent rotation of the cam element relative to the shaft while permitting the cam element to move longitudinally relative to the shaft.

5. An outside rear viewing vehicle as set forth in claim 1 wherein the clamping means includes a first plate member (24) mounted within the mirror head housing (16), a second plate member (26) means (34, 36) for adjustably mounting the second plate member upon the first plate member whereby the plate members are supported for rotation upon the bearing means.

6. An outside rear viewing vehicle as set forth in claim 5 wherein the adjustable mounting means include spring elements (36) for resiliently retaining the second plate member (26) against the bushing means.

7. An outside rear viewing vehicle as set forth in claim 5 wherein second plate member (26) is spaced from a first surface (89) of the cam element (28) when the mirror head assembly is in a rearward facing and viewing position, said second plate member coacting with a second surface (90) of the cam element to move the second plate member out of engagement with the bearing means when the mirror head assembly is rotated to a forward-facing nonviewing position and enabling the mirror head assembly to be longitudinally adjusted along the support arm shaft.

8. An outside rear viewing vehicle as set forth in claim 1 wherein the cam element includes a first outer surface (89) concentric with the shaft (15) and a second outer surface (90) eccentric with the shaft, the clamping means (24, 26) being out of engagement with said cam element outer surface when the mirror head assembly is in a normal rear viewing position.

9. An outside rear viewing vehicle as set forth in claim 1 wherein the clamping means (24, 26) is rotatable relative to the cam element to a forward-facing position wherein the mirror head assembly can be adjusted longitudinally along the shaft.

10. An outside rear viewing vehicle mirror of the type including a mirror head assembly (10); a support arm (12) adapted to be pivotally mounted on and project laterally from a side panel of the vehicle; said mirror assembly being supported upon said arm and adjustable relative thereto to vary the rear viewing field of vision and a mechanism (22) for adjusting the lateral distance of the mirror head assembly from the pivotally mounted end of the support arm, the mirror head being movable relative to the support arm between rearward-facing and viewing positions and forward-facing and nonviewing positions, the improvement comprising:

said support arm having a laterally extending shaft (15) with a longitudinal axis (17); said mirror head assembly having a mirror housing (16); said adjusting mechanism (22) being mounted within said housing and including bearing means (30, 32) for supporting the mirror head housing (16) for coaxial rotation about said shaft, means (26) for restraining the mirror housing against coaxial movement relative to said shaft, and a device (28) adapted to coact with the restraining means when the mirror head assembly is rotated to a forward-facing and nonviewing position to allow coaxial adjustment of the mirror head assembly along said shaft.

* * * * *